United States Patent [19]
Lipp et al.

[11] Patent Number: 5,758,289
[45] Date of Patent: May 26, 1998

[54] TELEPHONE SYSTEM AND BELL SOUND DETECTING METHOD THEREOF

[75] Inventors: Ronald Lee Lipp, Snellville, Ga.; Susumi Ohashi, Coppell, Tex.; Zhao Min, Abiko, Japan; Hiroki Ohno, Chiba, Japan; Kazuhiko Shimizu, Misato, Japan; Takahiro Kudo; Takashi Odagiri, both of Chiba, Japan

[73] Assignees: Uniden Corporation, Chiba, Japan; Uniden America Corporation, Fort Worth, Tex.

[21] Appl. No.: 488,077

[22] Filed: Jun. 7, 1995

Related U.S. Application Data

[63] Continuation-in-part of Ser. No. 234,062, Apr. 28, 1994, abandoned.

[51] Int. Cl.$^6$ .................................................... H04Q 7/24
[52] U.S. Cl. .................. 455/462; 455/74.1; 455/567; 379/428; 379/448
[58] Field of Search ...................... 379/58, 61, 100, 379/433, 435–36, 422, 424, 425–27, 448–50, 455, 279; 455/90, 74.1, 550, 555, 567, 462

[56] References Cited

U.S. PATENT DOCUMENTS

| | | | |
|---|---|---|---|
| 3,254,159 | 5/1966 | Condict | 179/41 |
| 3,662,109 | 5/1972 | Beathan | 379/448 |
| 3,838,219 | 9/1974 | Mason | 379/448 |
| 3,838,220 | 9/1974 | Gormly | 379/100 |
| 4,392,017 | 7/1983 | Torres | 379/448 X |
| 4,558,178 | 12/1985 | Yasuta et al. | 179/2 E |
| 4,575,584 | 3/1986 | Smith et al. | 379/279 |
| 4,839,918 | 6/1989 | Hata | 379/61 |
| 4,882,745 | 11/1989 | Silver | 379/61 |
| 5,010,565 | 4/1991 | Nash et al. | 379/61 |
| 5,048,073 | 9/1991 | Weiser et al. | 379/61 |
| 5,113,428 | 5/1992 | Fitzgerald | 379/61 |
| 5,123,042 | 6/1992 | Saegusa et al. | 379/61 |
| 5,233,644 | 8/1993 | Yamagata et al. | 379/58 |
| 5,365,570 | 11/1994 | Boubelik | 379/59 |

FOREIGN PATENT DOCUMENTS

| | | | |
|---|---|---|---|
| 54-162908 | 12/1979 | Japan | H04M 1/72 |
| 1-36250 | 2/1989 | Japan | H04M 1/00 |
| 1-77292 | 3/1989 | Japan | H04Q 3/58 |
| 1245740 | 9/1989 | Japan | H04M 1/00 |
| 1264496 | 10/1989 | Japan | H04Q 3/58 |
| 2302148 | 12/1990 | Japan | H04M 1/00 |
| 5207359 | 1/1992 | Japan | H04Q 3/58 |
| 4-88741 | 3/1992 | Japan | H04M 3/50 |
| 4237248 | 8/1992 | Japan | H04M 1/64 |
| 5207538 | 8/1993 | Japan | H04Q 3/58 |

*Primary Examiner*—Dwayne Bost
*Assistant Examiner*—William G. Trost
*Attorney, Agent, or Firm*—Sidley & Austin

[57] ABSTRACT

A relay lifter comprises a hook switch unit for turning ON/OFF a hook switch in response to a talk switch, a voice switching unit for switching connection of an aural signal in said corded telephone set between a transmitter/receiver of said corded telephone set and a cordless telephone set, and a bell sound detection signal transfer unit, a bell sound is outputted from said cordless telephone set when a bell sound is detected and an incoming call is accepted, a hook switch is turned ON/OFF using a hook switch ON/OFF unit, and connection of an aural signal in said corded telephone set is switched to said cordless telephone set for transmitting and receiving voice using said cordless telephone set.

11 Claims, 7 Drawing Sheets

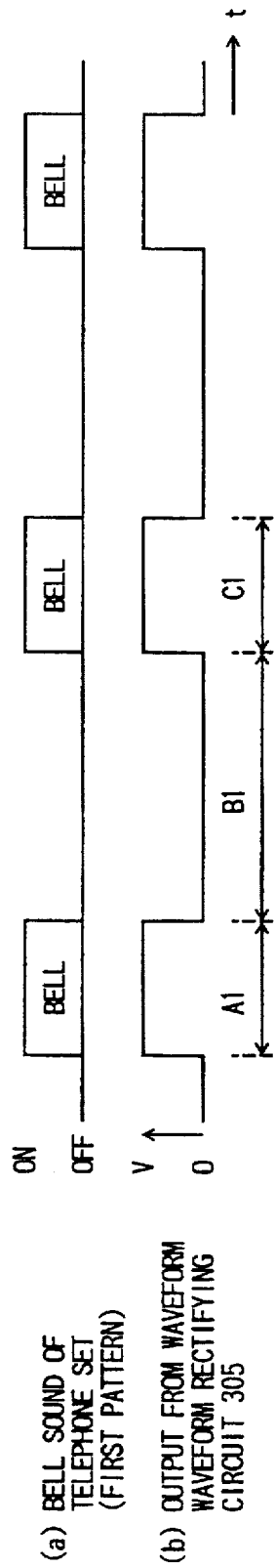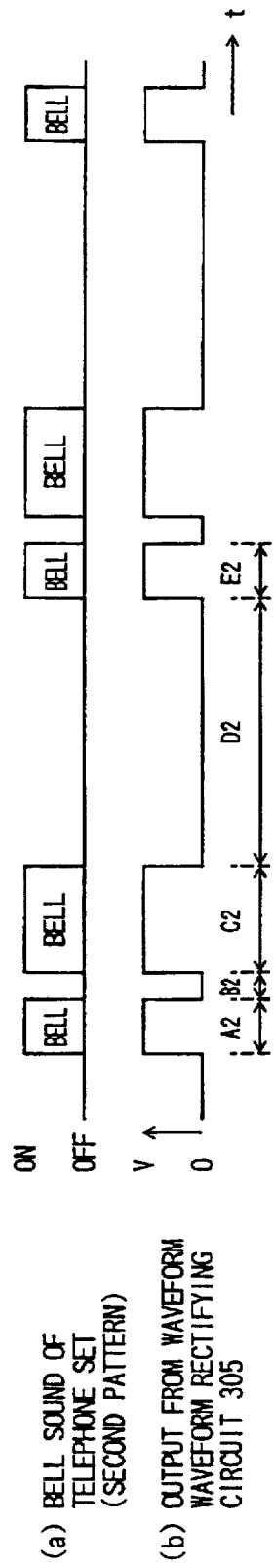

5,758,289

TELEPHONE SYSTEM AND BELL SOUND DETECTING METHOD THEREOF

STATEMENT OF RELATED APPLICATIONS

This application is a continuation-in-part of U.S. application No. 234,062, filed Apr. 28, 1994 and now abandoned.

FIELD OF THE INVENTION

The present invention relates to cordless telephones. In one embodiment, a cordless telephone is adapted to interface to a corded telephone operating in conjunction with a digital PBX.

The present invention relates to a telephone system using a corded telephone set and a cordless telephone set as well as to a hook switch ON/OFF device in the telephone system and a bell sound detecting method, and more particularly to a telephone system and a bell sound detecting method in which, when a hook switch ON/OFF device is integrated with a corded telephone set, a number of signal lines between the analog cordless telephone set and the corded telephone set is reduced, thus a freedom of degree in installation of the analog cordless telephone set being enhanced with more flexible system installation allowable, and also a bell sound detector, which can detect a bell sound specific to a corded telephone set without fail, is provided and for this reason, malfunction due to, for instance, a bell sound of adjacent telephone sets will never occur.

BACKGROUND OF THE INVENTION

Recent advancements in office communications have provided sophisticated equipment which offer a broad range of features. Much of this equipment is supported by and interfaces to the modern private area branch exchange telephone switch, (hereinafter referred to as a PBX). Previously, analog technology was employed in PBX equipment. As such, communications through the PBX has utilized analog circuit technology.

The majority of modern PBX installations are now employing digital communications technology. This technology supports the features and advancements mentioned above. The telephone sets which interface to a digital PBX must also communicate using digital signaling. Therefore, voice message are converted from analog signals to specific digital communications signals, according to the design of the particular PBX the telephone set is intended to interface to. This type of telephone set, also known as a digital telephone set, comprises a CODEC function that converts analog signals to digital signals and digital signals to analog signals.

Furthermore, the signaling between the modern digital PBX and the public switched telephone network, (hereinafter referred to as the PSTN), may also be via digital signaling, as opposed to analog signaling.

A digital telephone set has a handset for transducing the audio transmit and receive signals, or voice messages, into audio signals which are coupled to a telephone base unit via a wire or cord. Within the base unit, the CODEC transforms the analog signals into digital signals. The digital signals are then coupled to the digital PBX, or a digital telephone line, according to a defined protocol.

A cordless telephone set is similar to the aforementioned telephone set except the cord or wire interconnecting the handset and base units is replaced with a radio link. A cordless telephone makes it possible for users to send and receive voice messages over longer distances, by virtue of the removal of the cord, and also eliminates the inconvenience of the cord, such as tangling, and etc. Even though the cordless telephone set utilizes a radio link between the handset and base unit, the connection to the PSTN, or PBX, is similar to the telephone set in that a cord or wire is used to accomplish the interconnection.

Considering the foregoing, a conventional, or corded, telephone set may be of the type that communicates using either digital or analog signaling, and likewise, a cordless telephone set may be of the type that communicates using either digital of analog signaling. In any case, the term digital or analog is derived from the communications protocol between the base unit and the PSTN or PBX. It does not refer to the RF modulation or signaling protocol used between the base unit and the handset.

In recent years, in association with the deployment of digital PBX systems, a large number of corded digital telephone sets have been deployed. However, there has not been a large deployment of digital cordless telephone sets. Digital telephone sets are more expensive that analog telephone sets, and this may account for the reason that there has not been a large deployment of digital cordless telephone sets.

Conversely, the has been a large deployment of analog cordless telephone sets in the private sector. Clearly demonstrating that a demand exists for cordless telephone sets. The large scale deployment of analog cordless telephone sets has caused the economies of scale to reduce the price of such units to an affordable level.

There is a demand for an affordable cordless telephone set which can be utilized in digital telephone systems such as digital PBX systems, digital key telephone system, or over a digital telephone line linked directly to the PSTN.

In recent years, in association with automation in offices and plants, as an exchanger (PBX) for business use, a digital PBX, to which various types of office automation equipment can be connected, has been widely used in place of an analog PBX for an office telephone system. When a digital PBX is employed as a PBX, it is necessary to use a telephone set enabling telephone call following a communication protocol for a digital PBX as a telephone set connected to the digital PBX. Also, a digital telephone set using a digital line has spread in place of an analog telephone set using an analog line. In this case, it is necessary to use a telephone set having a CODEC function for converting a digital signal inputted from a digital line to an analog signal.

There are now various types of telephone sets including a corded telephone set in which a transmitter/receiver and a main body of the telephone set are connected with a wire and a user's voice inputted from the transmitter/receiver is transferred through the wire to a public telephone line or a PBX, or a cordless telephone set in which a transmitter/receiver and a main body of the telephone set is connected by means of radio communication and a user's voice inputted from the transmitter/receiver is transmitted to the main body of the telephone set by means of radio communication and then transmitted from the main body of the telephone set through a wire to a public telephone line or a PBX. As a user can move around in a wider range during talk over a cordless telephone set as compared to a corded telephone set, now more and more users hope to shift from a wired telephone set to a cordless telephone set. In recent years, of these types of telephone set as described above, in association of diffusion of a digital line and a digital PBX, a digital corded telephone set, which can respond to an analog line or a digital PBX and is more expensive as compared to a corded telephone set responding to an analog line or an analog telephone set or an analog cordless telephone set, has been becoming more and more popular. It should be noted that the corded telephone set responding to a digital line as defined herein is a corded telephone set enabling telephone call following a communication protocol for an exchanger in a station in a public telephone network and the corded telephone set responding to a digital PBX is a corded telephone set enabling telephone call following a communication protocol for a private exchanger.

However, some users hope to use a digital corded telephone set responding to a digital line or a digital PBX also as a cordless telephone set, and to realize this, the users are compelled to purchase a cordless telephone set responding to a digital line or a digital PBX which is more expensive. To respond to the needs as described above, proposed in patent application Ser. No. 086716/1995 is a telephone system allowing use of a cheap cordless telephone set even if the digital corded telephone set responding to a digital line or a digital PBX is connected to a digital line or a digital PBX.

This telephone system comprises a hook switch ON/OFF device working according to an ON/OFF control signal responding to a talk switch of an analog cordless telephone set, and voice is transmitted and received using the analog cordless telephone set by turning ON/OFF a hook switch of a corded telephone set by operating the talk switch.

The conventional type of telephone systems as described above, however, comprises a signal line between an analog cordless telephone set and a corded telephone set, a signal line between the cordless telephone set and a transmitter/receiver of the corded telephone set, a signal line between the cordless telephone set and a hook switch ON/OFF device, and a signal line between the analog cordless telephone set and a bell sound detector, so that, even if the hook switch ON/OFF device is integrated with the corded telephone set, there exist four signal lines between the cordless telephone set and the corded telephone set, and for this reason a site for installation of the cordless telephone set is limited to an area near the corded telephone set, and a freedom of degree in system installation is rather limited.

Also, if a basic body of a telephone set does not have the CODEC function for converting a digital signal from a digital line to an analog signal, a bell sound can not be detected, and even when a means for detecting a bell sound is provided, if the bell sound detector is realized with detection of a sound with a microphone or with detection of vibration caused by a bell sound, sometimes malfunction may occur due to a bell sound of or voice (vibration caused by sound) from adjacent telephone sets or for other reasons, which is disadvantageous.

SUMMARY OF THE INVENTION

It is an object of the present invention to provide a telephone system which can be used by connecting a low price cordless telephone set thereto.

In a telephone system according to the present invention, voice messages are sent and received using an analog cordless telephone set by operating a talk switch on the analog cordless telephone set and using a hook switch ON/OFF device working according to an ON/OFF control signal correlating to the talk switch to turn ON/OFF a hook switch of the corded telephone set.

In a telephone system according to the present invention, voice messages are sent and received using an analog cordless telephone set by operating a talk switch on the analog cordless telephone set and using a hook switch ON/OFF device working according to an ON/OFF control signal correlating to the talk switch to turn ON/OFF the hook switch of the corded telephone set.

In a telephone system according to the present invention, voice messages are sent and received between a corded telephone set and an analog cordless telephone set by changing an array of a plurality of signal lines input via a signal I/O terminal to an array of signal lines which can be processed by the analog cordless telephone with an interface means in the analog cordless telephone set and also changing an array of signal lines output via the signal I/O terminal to an array of signal lines which can be processed by the corded telephone set.

In a telephone system according to the present invention, voice messages are sent and received through radio communication between a handset of an analog cordless telephone set and a base unit of the analog cordless telephone set and also voice messages are sent and received between the analog cordless telephone set and a corded telephone set through corded communication via a voice I/O terminal of the corded telephone set and a signal I/O terminal of the corded telephone set.

In a telephone system according to the present invention, voice messages are sent and received using an analog cordless telephone set by operating a talk switch of an analog cordless telephone set and also using a call/non-call shifting means to switch operating mode of a corded telephone set to a calling state or a non-calling state and a ringer sound is output from the analog cordless telephone set when a ringer sound is detected by the corded telephone set and the incoming call is accepted.

In a telephone system according to the present invention, a ringer sound is detected by detecting a sound or vibration from a corded telephone set with a ringer sound detecting means.

In a hook switch ON/OFF method in a telephone system according to the present invention, a separating member for releasing a handset from a hook switch is provided between a base unit of a corded telephone set and the handset thereof and the hook switch of the corded telephone set is turned ON/OFF by releasing/placing the handset on or off the hook switch with the separating member according to a signal from the talk switch of the analog cordless telephone set.

In a hook switch ON/OFF device in a telephone system according to the present invention, the hook switch is turned ON/OFF by moving the separating member provided between a base unit of a corded telephone set and a handset thereof in the vertical direction to release the handset from the hook switch according to a signal from a talk switch of an analog cordless telephone set.

In a hook switch ON/OFF device in a telephone system according to the present invention, a frame with a separating member, a solenoid, and a driving motor packaged therein by a fixing means is fixed at a position near a handset of a corded telephone set.

In a telephone system according to the present invention, voice messages are sent and received using a second telephone set by operating a talk switch of the second telephone set which can not send nor receive voice messages following the digital PBX communication protocol and using a call/non-call shifting means to switch the operating mode of a first telephone set which can send and receive voice messages following the digital PBX protocol to a calling state or a non-calling state.

In a telephone system according to the present invention, voice messages are sent and received (first call) using a second telephone set by operating a talk switch of a second telephone set which can not send nor receive voice messages following the digital PBX communication protocol and using a call/non-call shifting means to switch operating mode of a first telephone set which can send and receive voice messages following the digital PBX communication protocol. Also voice messages are sent and received using a handset of the first telephone set (second call).

In a telephone system according to the present invention, an array of a plurality of signal lines input via a signal I/O terminal is changed to an array of signal lines which can be processed by the analog cordless telephone with an interface means in a second telephone set, and an array of signal lines output via the signal I/O terminal to an array of signal lines processable by a first telephone set.

In a telephone set according to the present invention, in sending and receiving voice messages using said second telephone set, the voice messages are sent and received through radio communication between a handset of said second telephone set and the base unit thereof, and in sending and receiving voice messages between said second telephone set and a first telephone set, the voice messages are sent and received through corded communication via a voice I/O terminal of said first telephone set and a signal I/O terminal of the first telephone set.

In a telephone system according to the present invention, voice messages are sent and received using a second telephone set by operating a talk switch of the second telephone set which can not send nor receive voice messages following the digital PBX communication protocol and using a call/non-call shifting means to switch operating mode of the first telephone set which can send and receive voice messages following the digital PBX protocol, and a ringer sound from the second telephone set is output when a ringer sound from the first telephone set is detected and the incoming call is accepted.

In a telephone system according to the present invention, a ringer sound is detected by detecting a sound or vibration from a first telephone set with a ringer sound detecting means.

In a hook switch ON/OFF method in a telephone system according to the present invention, a separating member for releasing/placing a handset from/on a hook switch is provided between a base unit of a first telephone set which can send and receive voice messages following the specific digital PBX communication protocol, and the hook switch of the first telephone set is turned ON/OFF by releasing/placing the handset from/on the hook switch with the separating member according to a signal from a talk switch of a second telephone set which can not send nor receive voice messages following the digital PBX communication protocol.

In a hook switch ON/OFF device in a telephone system according to the present invention, the hook switch is turned ON/OFF by moving in the vertical direction the separating member provided between a base unit of a first telephone set which can send and receive voice messages following the specific digital PBX communication protocol to release the handset from the hook switch with the separating member according to a signal from a talk switch of a second telephone set which can not send nor receive voice messages following the specific digital PBX communication protocol.

In a hook switch ON/OFF device in a telephone system according to the present invention, the hook switch is turned ON/OFF by moving in the vertical direction, a separating member provided between a base unit of a first telephone set which can send and receive voice messages following the specific digital PBX communication protocol to separate the handset from the hook switch with the separating member according to a signal from a talk switch of a second telephone set which can not send nor receive voice messages following the specific digital PBX communication protocol. Also a frame with a separating member, a solenoid, and a driving motor packaged therein is fixed at a position near the handset of the first telephone set with a fixing means.

In a telephone system according to the present invention, voice messages are sent and received using a second telephone set by operating a talk switch of the second telephone set not having a CODEC function for converting a digital signal input from a digital line to an analog signal and using a call/non-call shifting means to switch operating mode of a first telephone set having the CODEC function for converting a digital signal input from a digital line to an analog signal to a calling state or a non-calling state.

In a telephone system according to the present invention, voice messages are sent and received (first call) using a second telephone set by operating a talk switch of a second telephone set not having a CODEC function for converting a digital signal input from a digital line to an analog signal and using a call/non-call shifting means to switch operating mode of a first telephone set having the CODEC function for converting a digital signal input from a digital line to an analog signal. Also voice messages are sent and received using the handset of the first telephone set (Second call).

In a telephone system according to the present invention, an array of a plurality of signal lines input via a signal I/O terminal is changed to an array of signal lines processable by the analog cordless telephone by an interface means of a second telephone set not having a CODEC function for converting a digital signal input from a digital line to an analog signal, and also an array of signal lines output via the signal I/O terminal are changed to an array of signal lines processable by a first telephone set.

In a telephone system according to the present invention, in sending and receiving voice messages using a second telephone set not having a CODEC function for converting a digital signal input from a digital line to an analog signal the voice messages are sent and received through radio communication between a handset of the second telephone set and a base unit thereof, and in sending and receiving voice messages between the second telephone set and the first telephone set, the voice messages are sent and received through corded communication via an voice I/O terminal of the first telephone set and a signal I/O terminal thereof.

In a telephone system according to the present invention, voice messages are sent and received (first call) using a second telephone set by operating a talk switch of a second telephone set not having a CODEC function for converting a digital signal input from a digital line to an analog signal and using a call/non-call shifting means to switch operating mode of a first telephone set having the CODEC function for converting a digital signal input from a digital line to an analog signal, and a ringer sound is output from the second telephone set when a ringer sound from the first telephone set is detected and the incoming call is accepted.

In a telephone system according to the present invention, a ringer sound is detected by detecting a sound or vibration from a first telephone set with a ringer sound detecting means.

In a hook switch ON/OFF method in a telephone system according to the present invention, a hook switch of a first telephone set having a CODEC function for converting a digital signal input from a digital line to an analog signal is turned ON/OFF by releasing a handset from a hook switch with a separating member according to a signal from a talk switch of a second telephone set having the CODEC function for converting a digital signal input from a digital line to an analog signal.

In a hook switch ON/OFF device in a telephone system according to the present invention, a hook switch is turned ON/OFF by moving in the vertical direction a separating member provided between a base unit of a first telephone set having a CODEC function for converting a digital signal input from a digital line to an analog signal and a handset thereof to release the handset from the hook switch with the separating means according to a signal from a talk switch of a second telephone set not having the CODEC function for converting a digital signal input from a digital line to an analog signal.

In a hook switch ON/OFF device in a telephone system according to the present invention, a hook switch is turned ON/OFF by moving in the vertical direction a separating member provided between a base unit of a first telephone set having a CODEC function for converting a digital signal input from a digital line to an analog signal to release the handset from the hook switch with the separating member according to a signal from a talk switch of a second telephone set not having the CODEC function for converting a digital signal input from a digital line to an analog signal. Also a frame with a separating member, a solenoid, and a driving motor packaged therein is fixed at a position near a handset of the first telephone set with a fixing means.

In a hook switch ON/OFF device in a telephone system according to the present invention, a frame is fixed at a position near a handset of a first telephone set with a fixing means comprising a Velcro(R) fastener.

In a telephone system according to the present invention, the hook switch ON/OFF device is monolithically molded with or integrated to an analog cordless telephone set or a second telephone set, and by mounting the analog cordless telephone set or the second telephone set near a corded telephone set or a first telephone set, the separating means can be located under the handset thereof.

In a telephone system, according to the present invention, the hook switch ON/OFF device is engaged in an engaging section formed in an analog cordless telephone set or a second telephone set, thus the hook switch ON/OFF device being integrated to the telephone set.

It is an object of the present invention to provide a telephone system which enables enhancement of a freedom of degree in installation of a cordless telephone set and provides higher flexibility such as, for instance, hanging a cordless telephone set on a wall, when a hook switch ON/OFF device is integrated with a corded telephone set, by enabling transaction of all type of signal through only one signal line between a cordless telephone set and a corded telephone set. It is another object of the present invention to provide a telephone system and a bell sound detecting method, in which malfunction due to a bell sound of or voice (vibration caused by sound) adjacent telephone set or for other reasons will never occur because there is provided a bell sound detector which can detect only a bell sound specified to a corded telephone set without fail.

In a telephone system according to the present invention, a bell sound generated by said corded telephone set is detected by the aforesaid bell sound detector, and, when an incoming call is received, a bell sound is outputted from the aforesaid cordless telephone set, and by operating a talk switch of the aforesaid cordless telephone set, a hook switch of the aforesaid corded telephone set is turned ON/OFF using the aforesaid hook switch ON/OFF unit working according to a first control signal responding to the talk switch, and also connection of an aural signal in the aforesaid corded telephone set is switched to the aforesaid cordless telephone set using the aforesaid voice switching unit working according to a second control signal responding to the talk switch, thus voice being transmitted and received using the aforesaid cordless telephone set. A voice switching unit and a bell sound detection signal transfer unit are provided in a relay lifter, so that a signal line between the relay lifter and a cordless telephone set may be only one, namely an aural signal, a control signal, and a detection signal can be transacted over only one signal line, so that a freedom of degree in installation of a cordless telephone set can be enhanced and a telephone system enabling more flexible system installation can be realized.

In a telephone system according to the present invention, by operating a talk switch of the aforesaid cordless telephone set, a hook switch of the aforesaid corded telephone set is turned ON/OFF using said hook switch ON/OFF unit, and also by using the aforesaid voice switching unit connection of an aural signal in the aforesaid corded telephone set is switched to the aforesaid cordless telephone set to execute transaction of voice using the aforesaid cordless telephone set, and also by using the aforesaid voice switching unit connection of an aural signal in the aforesaid corded telephone set to a transmitter/receiver of the aforesaid corded telephone set to execute transaction of voice using a transmitter/receiver of the aforesaid corded telephone set.

In a telephone set according to the present invention, between a transmitter/receiver of a cordless telephone set and a basic body of a cordless telephone set, voice is transmitted and received by means of radio communication, and between a cordless telephone set and a corded telephone set, voice is transmitted and received by wired communication through a voice input/output terminal section of the corded telephone set and a signal input/output terminal section of the corded telephone set.

Also, in a telephone system according to the present invention, the aforesaid corded telephone set is a telephone set enabling telephone call following a communication protocol for a digital PBX, while the aforesaid cordless telephone set is a telephone not enabling telephone call following the communication protocol for a digital PBX.

In a telephone system according to the present invention, the aforesaid corded telephone set is a telephone set having a CODEC function for converting a digital signal inputted from a digital line to an analog signal, while the aforesaid cordless telephone set is a telephone set not having the CODEC function for converting a digital signal inputted from a digital line to an analog function.

In the telephone system according to the present invention, the aforesaid bell sound detector is realized with a vibration sensor for detecting vibration near a speaker of the aforesaid corded telephone set, a voltage waveform pattern of a detection signal received through a detection signal transfer unit in the aforesaid relay lifter is compared to a specified waveform pattern to differentiate a bell sound, and when a bell sound is identified, a bell sound is outputted from a speaker for bell of a cordless telephone set.

Furthermore, in a telephone system according to the present invention, the aforesaid relay lifter is monolithically mounted to the aforesaid corded telephone set with a mount bracket and a metal fitting. With this feature, a signal line between the cordless telephone set and the corded telephone set (relay lifter) may be only one, so that a freedom of degree of the cordless telephone set can be enhanced and a telephone system enabling more flexible system installation can be realized.

Furthermore, in a bell sound detecting method according to the present invention, a voltage waveform pattern of a detection signal is obtained from a vibration sensor for detecting vibration near a speaker of a telephone set in a first step, a voltage waveform pattern of the aforesaid detection signal is compared to a specified waveform pattern in a second step, and if, as a result of comparison in the second step, it is recognized that a voltage waveform of the detection signal is the same as the specified waveform pattern, the waveform is recognized as for a bell sound. With this feature, it is possible to differentiate a bell sound of or voice sound from adjacent telephone sets, so that frequencies of malfunction can be reduced.

Other objects and features of this invention will become understood from the following description with reference to the accompanying drawings.

BRIEF DESCRIPTION OF THE DRAWINGS

FIG. 5A is an explanatory view for a voltage waveform pattern detecting in a bell sound detection system when a bell sound in a corded telephone set is a first pattern;

FIG. 5B is an explanatory view for a voltage waveform pattern detected in a bell sound detection system when a bell sound is a second pattern;

DESCRIPTION OF THE PREFERRED EMBODIMENTS

Figure 1:
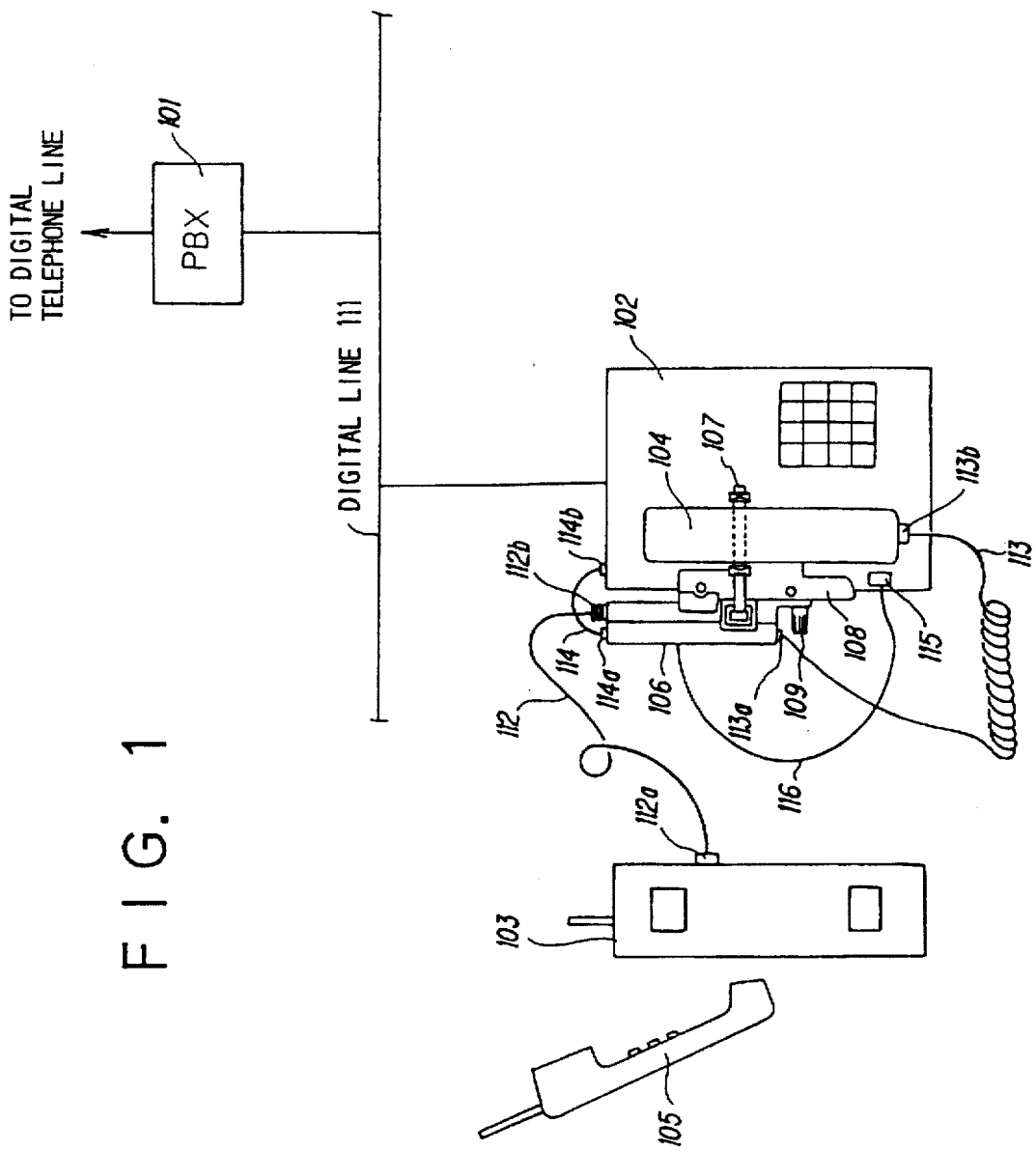
FIG. 1 is a block diagram showing a telephone system according to one embodiment of the present invention.

Now, a detailed description is made hereinafter for one embodiment of a telephone system according to the present invention with reference to the related drawings.

As described above, in a telephone system according to the present invention, voice messages are sent and received using an analog cordless telephone set by operating a talk switch of an analog cordless a hook switch ON/OFF device working according to an ON/OFF control signal correlating to the talk switch to turn ON/OFF a hook switch of the corded telephone set, and for this reason a cordless telephone set which can be available at a reasonable price can be connected thereto and used even in a case where digital corded telephone set is connected to a digital line or a digital PBX.

In a telephone system according to the present invention, voice messages are sent and received using an analog cordless telephone set by operating a talk switch of the analog cordless telephone set and using a hook switch ON/OFF device working according to an ON/OFF control signal correlating to the talk switch to turn ON/OFF the hook switch of the corded telephone set, and for this reason, a cordless telephone set can be connected thereto and used even in a case where a digital corded telephone set is connected to a digital line or a digital PBX, and at the same time the corded telephone set can be used as usual.

In a telephone system according to the present invention, voice messages are sent and received between a corded telephone set and an analog cordless telephone set by changing an array of a plurality of signal lines input via a signal I/O terminal to an array of signal lines which can be processed by the analog cordless telephone with an interface means of the analog cordless telephone set and also changing an array of signal lines output via the signal I/O terminal to an array of signal lines which can be processed by telephone set, and for this reason a cordless telephone set can be connected thereto and used even in a case where a digital corded telephone set is connected to a digital line or a digital PBX, and at the same time the corded telephone set can be used as usual.

In a telephone system according to the present invention, voice messages are sent and received through radio communication between a handset of an analog cordless telephone set and a base unit of the analog cordless telephone set and also voice messages are sent and received between the analog cordless telephone set and a corded telephone set through corded communication via a voice I/O terminal of the corded telephone set and a signal I/O terminal of the corded telephone set, and for this reason a cordless telephone set can be connected thereto and used even in a case where a digital corded telephone set is connected to a digital line or a digital PBX.

In a telephone system according to the present invention, voice messages are sent and received using an analog cordless telephone set by operating a talk switch of an analog cordless telephone set and also using a call/non-call shifting means to switch operating mode of a corded telephone set to a calling state or a non-calling state and a ringer sound is output from the analog cordless telephone set when a ringer sound is detected by the corded telephone set and the incoming call is accepted, and for this reason a cordless telephone set can be connected thereto and used even in a case where a digital corded telephone set is connected to a digital line or a digital PBX, and at the same time a ringer sound can be heard without fail.

In a telephone system according to the present invention, a ringer sound is detected by detecting a sound or vibration from a corded telephone set with a ringer sound detecting means, and for this reason the ringer sound can be heard without fail.

In a hook switch ON/OFF method in a telephone system according to the present invention, a separating member for releasing a handset from a hook switch is provided between a base unit of a corded telephone set and the handset thereof and the hook switch of the corded telephone set is turned ON/OFF by releasing/placing the handset from/on the hook switch with the separating member according to a signal from the talk switch of the analog cordless telephone set, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, the hook switch is turned ON/OFF by moving the separating member provided between a base unit of a corded telephone set and a handset thereof in the vertical direction to release the handset from the hook switch according to a signal from a talk switch of an analog cordless telephone set, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, a frame with a separating member, a solenoid, and a driving motor packaged therein by a fixing means is fixed at a position near a handset of a corded telephone set, and for this reason it is very easy to mount the hook switch ON/OFF device.

In a telephone system according to the present invention, voice messages are sent and received using a second telephone set by operating a talk switch of the second telephone set which can not sent nor received voice messages following the digital PBX communication protocol and using a call/non-call shifting means to switch operating mode of a first telephone set which can send and receive voice messages following the digital PBX protocol to a calling state or a non-calling state, and for this reason a cordless telephone set can be connected thereto and used even in a case where a digital corded telephone set is connected to a digital line or a digital PBX.

In a telephone system according to the present invention, voice messages are sent and received (first call) using a second telephone set by operating a talk switch of a second telephone set which can not send nor receive voice messages following the digital PBX communication protocol and using a call/non-call shifting means to switch operating mode of a first telephone set which can send and receive voice messages following the digital PBX communication protocol. Also voice messages are sent and received using a handset of the first telephone set (second call), and for this reason a cordless telephone set can be connected thereto and used even in a case where a digital corded telephone set is connected to a digital line or a digital PBX, and at the same time the corded telephone set can be used as usual.

In a telephone system according to the present invention, an array of a plurality of signal lines input via a signal I/O terminal is changed to an array of signal lines processable by the analog cordless telephone with an interface means in a second telephone set, and an array of signal lines output via the signal I/O terminal to an array of signal lines processable by a first telephone set, and for this reason a cordless telephone set can be connected thereto and used even in a case where a digital corded telephone set is connected to a digital line or a digital PBX, and at the same time the corded telephone set can be used as usual.

In a telephone set according to the present invention, in sending and receiving voice messages using said second telephone set, the voice messages are sent and received through radio communication between a handset of said second telephone set and the base unit thereof, and in sending and receiving voice messages between said second telephone set and a first telephone set, the voice messages are sent and received through corded communication via a voice I/O terminal of said first telephone set and a signal I/O terminal of the first telephone set, and for this reason a cordless telephone set can be connected thereto and used even in a case where a digital corded telephone set is connected to a digital line or a digital PBX.

In a telephone system according to the present invention, voice messages are sent and received using a second telephone set by operating a talk switch of the second telephone set which can not send nor receive voice messages following the digital PBX communication protocol and using a call/non-call shifting means to switch operating mode of the first telephone set which can send and receive voice messages following the digital PBX protocol, and a ringer sound from the second telephone set is output when a ringer sound from the first telephone set is detected and the incoming call is accepted, and for this reason a cordless telephone set can be connected thereto and used even in a case where a digital corded telephone set is connected to a digital line or a digital PBX, and at the same time the ringer sound can be heard without fail.

In a telephone system according to the present invention, a ringer sound is detected by detecting a sound or vibration from a first telephone set with a ringer sound detecting means, and for this reason the ringer sound can be heard without fail.

In a hook switch ON/OFF method in a telephone system according to the present invention, a separating member for releasing a handset from a hook switch is provided between a base unit of a first telephone set which can send and receive voice messages following the specific digital PBX communication protocol, and the hook switch of the first telephone set is turned ON/OFF by releasing/placing the handset from/on the hook switch with the separating member according to a signal from a talk switch of a second telephone set which can not send nor receive voice messages following the digital PBX communication protocol, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, the hook switch is turned ON/OFF by moving in the vertical direction the separating member provided between a base unit of a first telephone set which can send and receive voice messages following the specific digital PBX communication protocol to release the handset from the hook switch with the separating member according to a signal from a talk switch of a second telephone set which can not send nor receive voice messages following the digital PBX communication protocol, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, the hook switch is turned ON/OFF by moving in the vertical direction a separating member provided between a base unit of a first telephone set which can send and receive voice messages following the specific digital PBX communication protocol to release the handset from the hook switch with the separating member according to a signal from a talk switch of a second telephone set which can not send nor receive voice messages following the digital PBX communication protocol. Also a frame with a separating member, a solenoid, and a driving motor packaged therein is fixed at a position near the handset of the first telephone set with a fixing means, and for this reason a cordless telephone set can be connected thereto and used even in a case where a digital corded telephone set is connected to a digital line or a digital PBX.

In a telephone system according to the present invention, voice messages are sent and received using a second telephone set by operating a talk switch of the second telephone set not having a CODEC function for converting a digital signal input from a digital line to an analog signal and using a call/non-call shifting means to switch operating mode of a first telephone set having the CODEC function for converting a digital signal input from a digital line to an analog signal to a calling state or a non-calling state, and for this reason a cordless telephone set can be connected thereto and used even in a case where a digital corded telephone set is connected to a digital line or a digital PBX, and for this reason a cordless telephone set can be connected thereto and used even in a case where a digital corded telephone set is connected to a digital line or a digital PBX. In a telephone system according to the present invention, voice messages are sent and received (first call) using a second telephone set by operating a talk switch of a second telephone set not having a CODEC function for converting a digital signal input from a digital line to an analog signal and using a call/non-call shifting means to switch operating mode of a first telephone set having the CODEC function for converting a digital signal input from a digital line to an analog signal. Also voice messages are sent and received using the handset of the first telephone set (Second call), and for this reason a cordless telephone set can be connected thereto and used even in a case where a digital corded telephone set is connected to a digital line or a digital PBX, and at the same time the corded telephone set can be used as usual. In a telephone system according to the present invention, an array of a plurality of signal lines input via a signal I/O terminal is changed to an array of signal lines processable by the analog cordless telephone by an interface means of a second telephone set not having a CODEC function for converting a digital signal input from a digital line to an analog signal, and also an array of signal lines output via the signal I/O terminal are changed to an array of signal lines processable by a first telephone set, and for this reason a cordless telephone set can be connected thereto and used even in a case where a digital corded telephone set is connected to a digital line or a digital PBX, and at the same time the corded telephone set can be used as usual.

In a telephone system according to the present invention, in sending and receiving voice messages using a second telephone set not having a CODEC function for converting a digital signal input from a digital line to an analog signal the voice messages are sent and received through radio communication between a handset of the second telephone set and a base unit thereof, and in sending and receiving voice messages between the second telephone set and the first telephone set, the voice messages are sent and received through corded communication via an voice I/O terminal of the first telephone set and a signal I/O terminal thereof, and for this reason a cordless telephone set can be connected thereto and used even in a case where a digital corded telephone set is connected to a digital line or a digital PBX.

In a telephone system according to the present invention, voice messages are sent and received (first call) using a second telephone set by operating a talk switch of a second telephone set not having a CODEC function for converting a digital signal input from a digital line to an analog signal and using a call/non-call shifting means to switch operating mode of a first telephone set having the CODEC function for converting a digital signal input from a digital line to an analog signal, and a ringer sound is output from the second telephone set when a ringer sound from the first telephone set is detected and the incoming call is accepted, and for this reason a cordless telephone set can be connected thereto and used even in a case where a digital corded telephone set is connected to a digital line or a digital PBX, and at the same time the ringer sound can be heard without fail.

In a telephone system according to the present invention, a ringer sound is detected by detecting a sound or vibration from a first telephone set with a ringer sound detecting means, and for this reason the ringer sound can be heard without fail.

In a hook switch ON/OFF method in a telephone system according to the present invention, a hook switch of a first telephone set having a CODEC function for converting a digital signal input from a digital line to an analog signal is turned ON/OFF by releasing a handset from a hook switch with a separating member according to a signal from a talk switch of a second telephone set having the CODEC function for converting a digital signal input from a digital line to an analog signal, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, a hook switch is turned ON/OFF by moving in the vertical direction a separating member provided between a base unit of a first telephone set having a CODEC function for converting a digital signal input from a digital line to an analog signal and a handset thereof to release the handset from the hook switch with the separating means according to a signal from a talk switch of a second telephone set not having the CODEC function for converting a digital signal input from a digital line to an analog signal, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, a hook switch is turned ON/OFF by moving in the vertical direction a separating member provided between a base unit of a first telephone set having a CODEC function for converting a digital signal input from a digital line to an analog signal to release the handset from the hook switch with the separating member according to a signal from a talk switch of a second telephone set not having the CODEC function for converting a digital signal input from a digital line to an analog signal. Also a frame with a separating member, a solenoid, and a driving motor packaged therein is fixed at a position near a handset of the first telephone set with a fixing means, and for this reason a cordless telephone set can be connected thereto and used even in a case where a digital corded telephone set is connected to a digital line or a digital PBX.

In a hook switch ON/OFF device in a telephone system according to the present invention, a frame is fixed at a position near a handset of a first telephone set with a fixing means comprising a Velcro(R) fastener, and for this reason it is easy to mount the hook switch ON/OFF device.

In a telephone system according to the present invention, the hook switch ON/OFF device is monolithically molded with or integrated to an analog cordless telephone set or a second telephone set, and by mounting the analog cordless telephone set or the second telephone set near a corded telephone set or a first telephone set, the separating means can be located under the handset thereof, and for this reason it is very easy to mount the hook switch ON/OFF device.

In a telephone system, according to the present invention, the hook switch ON/OFF device is engaged in an engaging section formed in an analog cordless telephone set or a second telephone set, thus the hook switch ON/OFF device being integrated to the telephone set, and for this reason it is very easy to mount the hook switch ON/OFF device.

General configuration of the telephone system

FIG. 1 is a block diagram showing a telephone system according to one embodiment of the present invention. In this figure, the telephone system of the embodiment of the present invention comprises a digital PBX 101, to which a digital telephone line and a private digital line network 111 are connected, a corded telephone set 102 connected to the digital line network 111, a cordless telephone set (a basic body of the device) 103 connected to the corded telephone set 102, a relay lifter 106 moving up and down a rod 107 with a stopper to turn ON/OFF the hook switch of the corded telephone set 102 as well as switching connection with the corded telephone set 102 between a handset 104 of the corded telephone set 102 and a cordless telephone set 103, and a vibration sensor circuit (a bell sound detector) 115 provided adjacent to a speaker of the corded telephone set 102 and detecting a vibration therefrom.

In FIG. 1, designated at the reference numeral 104 is a handset of the corded telephone set 102, at 105 a handset of the cordless telephone set 103, at 107 a rod with a stopper, mounted to a slider moving up and down in the relay lifter 106 as a separator for separating a main body of the corded telephone set 102 from a handset 104, at 108 a mount bracket for mounting the relay lifter 106 on the corded telephone set 102, and at 109 a metal fitting (a cosmetic screw) on the side of the mount bracket 108.

Furthermore, in FIG. 1, a basic body 103 of the cordless telephone set and the relay lifter 106 are connected to each other through a signal line 112, and the reference numeral 112a indicates a signal input/output terminal section of the basic body 103 of the cordless telephone set, while the reference numeral 112b indicates a signal input/output terminal section of the relay lifter 106. Also, the relay lifter 106 and the handset 104 of the corded telephone set 102 are connected to each other through a signal line 113, and the reference numeral 113a indicates a second voice input/output terminal section of the relay lifter 106, while the reference numeral 113b indicates a voice input/output terminal section of the handset 104.

Also, the relay lifter 106 and the corded telephone set 102 are connected to each other through a signal line 114, and the reference numeral 114a indicates a first voice input/output terminal section of the relay lifter 106, while the reference numeral 114b indicates a voice input/output terminal section of the corded telephone set 102. Furthermore, the reference numeral 116 indicates a signal line delivering a bell sound detection signal from the vibration sensor circuit 115. It should be noted that the corded telephone set 102 connected to the digital line network 111 enables telephone call following a communication protocol of a digital PBX 101 and incorporates a CODEC circuit converting a digital signal inputted from the digital line 111 to an analog signal.

In a signal line between the basic body 103 of the cordless telephone set and the relay lifter 106, an aural signal, a detection signal from the vibration sensor circuit 115 and a position detector, a control signal for controlling a driving motor in the relay lifter 106 are included.

Figure 2:
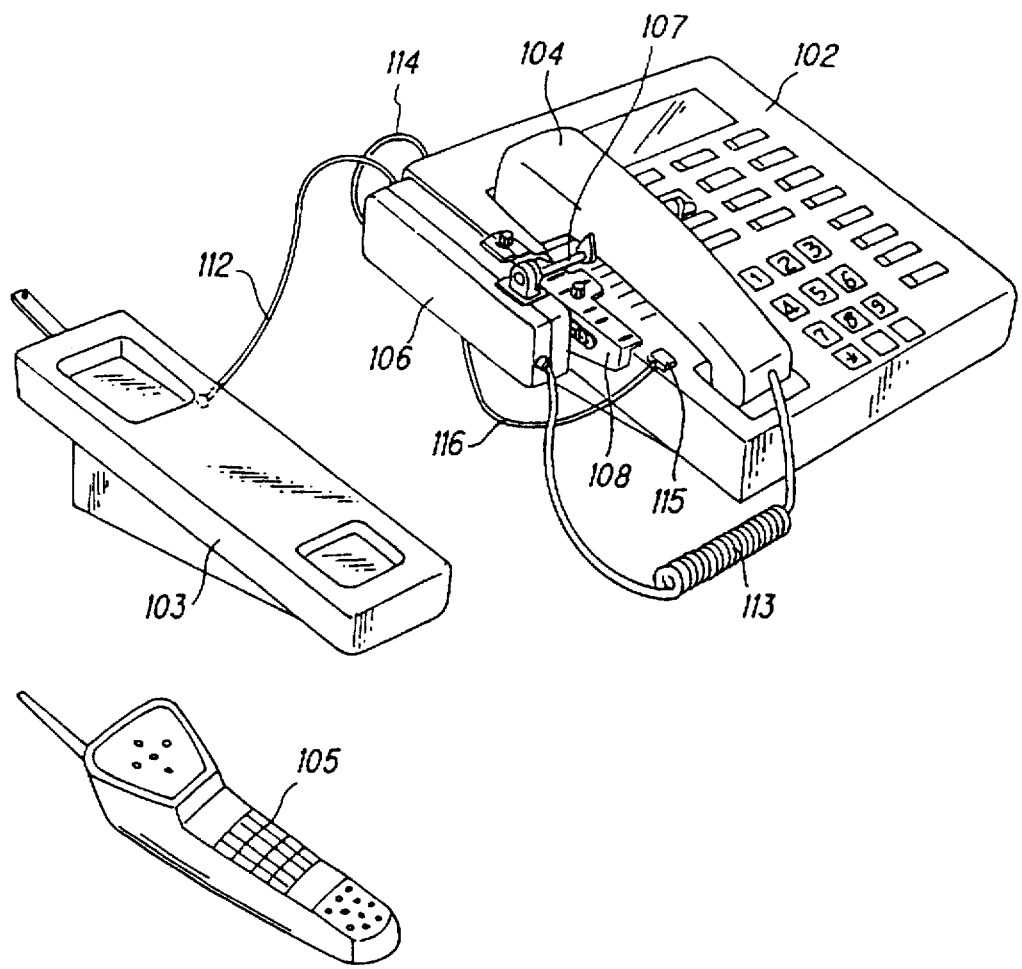
FIG. 2 is an appearance view showing the telephone system according to the embodiment above.

Also, the signal line 113 between the relay lifter 106 and the handset 104 of the corded telephone set 102, as well as the signal line 114 between the relay lifter 106 and the corded telephone set 102 are transfer mediums for an aural signal respectively. FIG. 2 shows an appearance view showing the telephone set of the embodiment of the present invention. The relay lifter 106 is mounted to the corded telephone set 102 with a mount bracket 108, the basic body 103 of the cordless telephone set is provided adjacent the corded telephone set in a state where the corded telephone set 102 is connected thereto through the signal line 112. As the handset 105 of the cordless telephone set 103 is freely portable in this state, a user can move therewith in a range where radio communication is possible between the basic body 103 of the cordless telephone set and the handset 105.

Vibration sensor circuit

Figure 3:
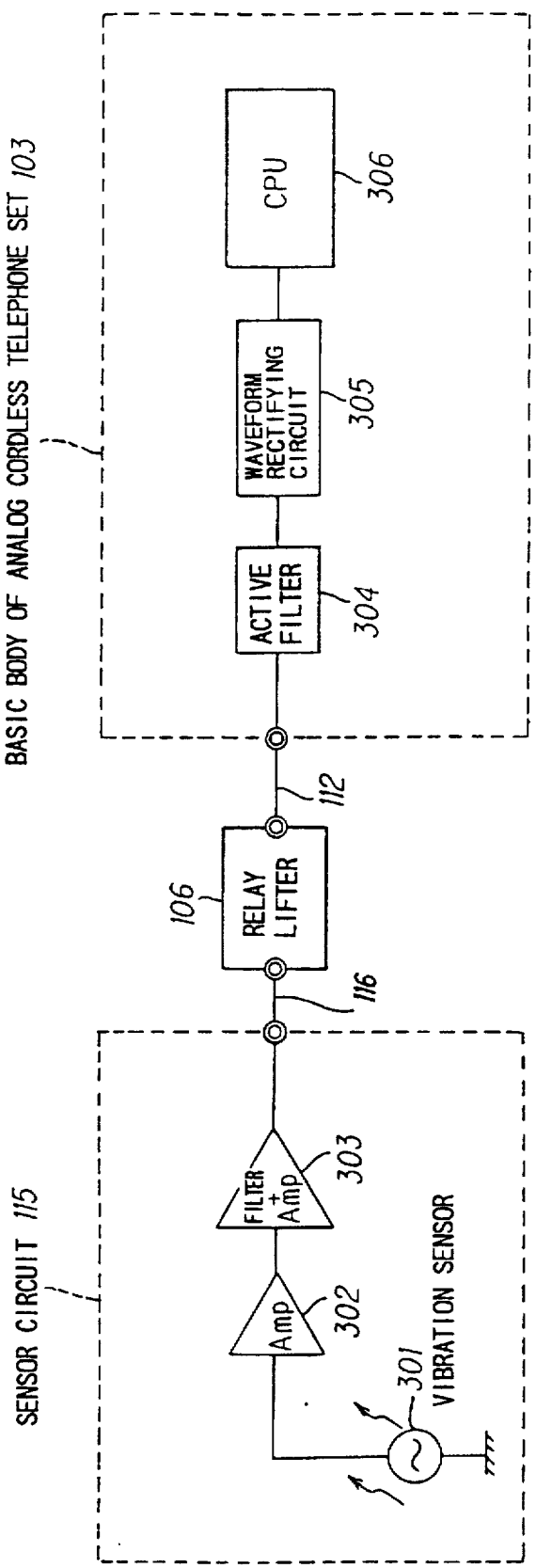
FIG. 3 is a block diagram showing the telephone system according to the embodiment above with system components for detection of a bell sound.

FIG. 3 is a block diagram showing the telephone system according to the embodiment of the present invention only with system components for detection of a bell sound. In this figure, the vibration sensor circuit 115 comprises a vibration sensor 301, an amplifier 302, as well as high-pass filter, and an active amplifier 303.

The vibration sensor 301 as well as the amplifier 302 are realized with, for instance, PKGS-45LA of Murata Manufacture Corporation. The active filter as well as an amplifier of the amplifier 303 amplify an output from the vibration sensor, and provide a gain of approximately 70 [Db]. Also, active filters are combined with each other to remove hum sound of power or other sounds, an output is passed through only a necessary frequency band to amplify.

Furthermore, an output from the active filter or the amplifier 303 is supplied to the relay lifter 106 through a signal line 116. It should be noted that the vibration sensor circuit 115 is a minimized unit, and is put on adjacent the speaker of the corded telephone set 102 with a double faced tape.

Cordless telephone set

A bell sound detection signal detected in the vibration sensor circuit 115 is supplied to the relay lifter 106 and to the basic body 103 of the cordless telephone set through the signal line 112 which is also available for transmitting and receiving an aural signal and a control signal to and from the relay lifter 106. FIG. 3 shows only the system components for detection of a bell sound in a circuit portion of the basic body 103 of the cordless telephone set. Namely, as system components for detection of a bell sound, an active filter 304, a waveform shape-up circuit 305 and a CPU 306 are provided.

A bell sound detection system in the embodiment of the present invention is a system where a voltage waveform pattern of a detection signal is compared to a specified waveform pattern to differentiate a bell sound, and a vibration of a bell sound is reflected to a voltage waveform in the form of frequency of the bell sound, and it is too microscopic to recognize as a waveform pattern, so that a period of time when a speaker outputs a bell sound from the corded telephone set 102 becomes ON is recognized as one pattern by means of passing the bell sound through the active filter 304 and furthermore shaping-up a waveform shape-up by the waveform shape-up circuit 305.

Microscopic vibrations like that generated when a desk on which the corded telephone set 102 is provided is tapped can be canceled by an active filter 304 in the vibration sensor circuit 115 and the active filter 304.

A voltage waveform pattern of a detection signal waveform shaped up with the waveform shaped up circuit 305 is supplied to the CPU 306, and is compared to a specified waveform pattern with a control sequence in the CPU 306, and when the voltage waveform pattern is identified, a bell sound is differentiated, when it is not identified, voice or other sounds are differentiated. When a bell sound is differentiated, it is delivered to the CPU (not shown) in the handset 105 of the cordless telephone set 103 and cause the speaker in the handset 105 to output a bell sound.

In the basic body 103 of the cordless telephone, in addition, a detection signal from the position detecting circuit for detecting a position of a slider moving up and down in the relay filter 106 is also supplied to the CPU 306, furthermore a control signal for controlling a driving motor in the relay lifter 106 is outputted from the CPU 306 through a control circuit (UP/DOWN CONTROL circuit) and a signal input/output terminal section to the relay lifter 106.

On the other hand, in the handset 105 of the cordless telephone set 103, a talk switch (not shown) is provided, and when telephone call is placed using the cordless telephone set 103, or when telephone call is finished, a talk switch which is an ON/OFF switch is pressed down, and an ON/OFF state of the talk switch is informed to the basic body 103 of the cordless telephone set by the CPU in the handset 105. It should be noted that in another configuration, a common cordless telephone set, for instance, an analog cordless telephone set "EXP901#" produced by UNIDEN Corporation can be employed.

Relay lifter

Figure 4:
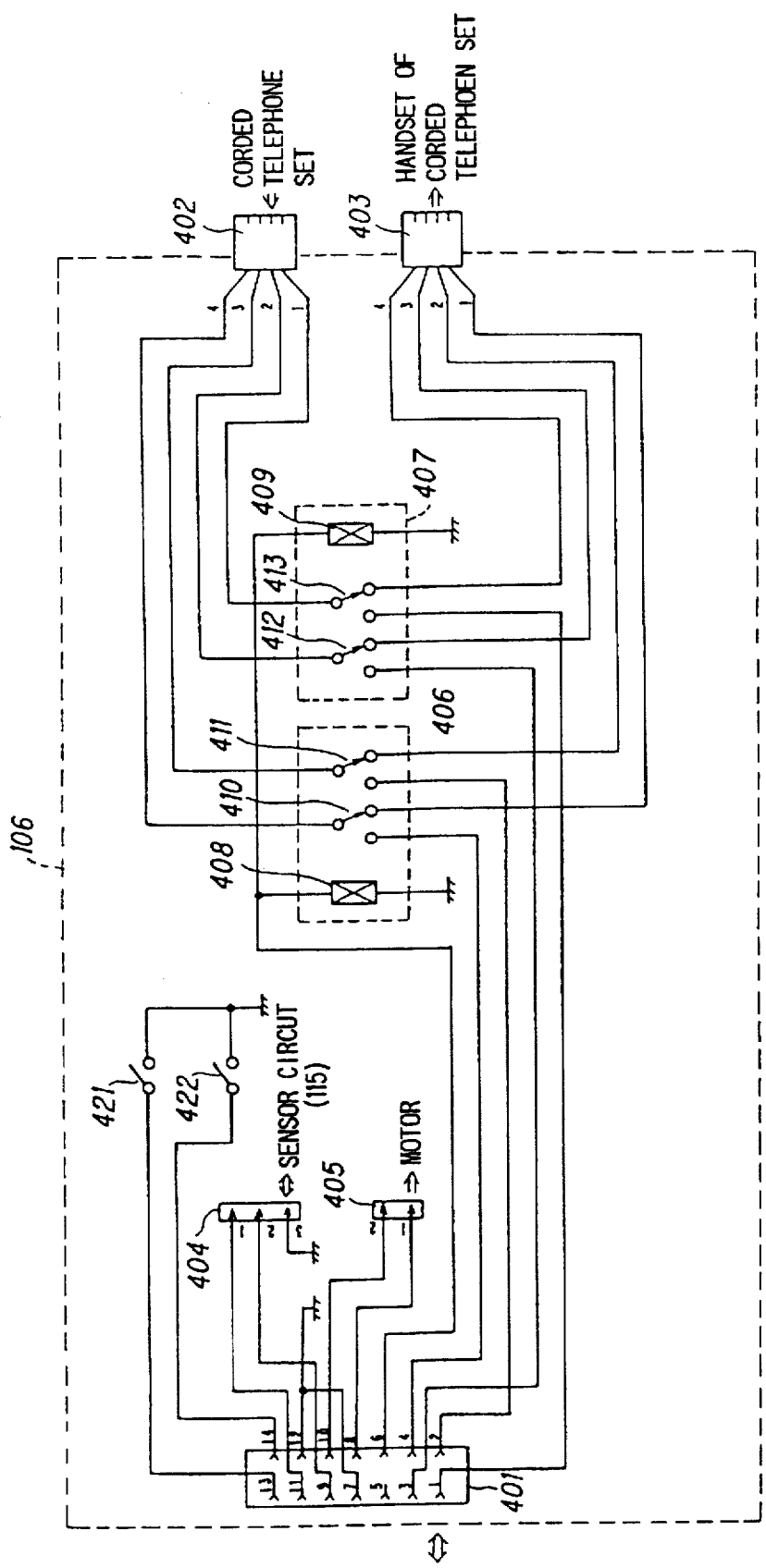
FIG. 4 is a circuit block diagram showing configuration of an electric system in a relay lifter.

FIG. 4 is a circuit block diagram showing configuration of the electric system in the relay lifter 106. In the figure, the reference numeral 401 indicates an external connector corresponding to a signal input/output terminal section 112b of the signal line 112 connected to the basic body 103 of the cordless telephone set, the reference numeral 402 indicates an external connector corresponding to a first voice input/output terminal section 114a of the signal line 14 connected to the corded telephone set 102, the reference numeral 403 indicates an external connector corresponding to a second voice input/output terminal section 113a of the signal line 113 connected to the handset 104 of the corded telephone set 102.

The reference numeral 404 indicates a connector connected to the vibration sensor circuit 115 provided in the corded telephone set 102 and fetching a bell detection signal from the vibration sensor circuit 115, and the reference numeral 405 indicates an internal connector connected to the driving motor in the relay lifter 106 and outputting a control signal of the driving motor supplied from the CPU 306 in the basic body 103 of the cordless telephone set. The reference numerals 421 and 422 indicates a position detecting circuit for detecting a position of a slider moving up and down, which detects a position of a slider with an ON/OFF state of a position switch. Namely, when both of the position switches 421 and 422 are ON, it indicates a state where a slider has risen up to the top, and when both of them are OFF, it indicates a state where the slider has been down to the bottom, and when one of the two is ON or OFF, it indicates that the slider is moving.

The reference numerals 406 and 407 indicates a voice switching circuit for switching connection with the corded telephone set 102 between the handset 104 of the corded telephone set 102 and the cordless telephone set 103. Namely, an aural signal from the corded telephone set 102 fetched through the external connector 402 is switched with voice switching circuits 406 and 407, and is supplied through the external connector 401 to the basic body 103 of the cordless telephone set, or is supplied through the external connector 403 to the handset 104 of the corded telephone set 102.

An operation for switching the voice switching circuits 406 and 407 is executed, when pressing down of the talk switch is detected in the handset 105 of the cordless telephone set 103, by the CPU 306 by supplying an ON/OFF control signal responding to the talk switch to the relays 408 and 409 of the voice switching circuits 406 and 407 and by the switches 410 to 413 switching in correlation to operations of the relays 408 and 409 according to the ON/OFF control signal.

Thus, a signal transfer path (an external connector 401 and a connector 404) to the voice switching circuits 406 and 407 as well as to the vibration sensor circuit 115 are provided in the relay lifter 106, so that just only one signal line is required between the relay lifter 106 mounted on the corded telephone set 102 and the basic body 103 of the cordless telephone set, and with this feature it is possible to realize a telephone system with a enhanced freedom of degree in installation of various components thereof and higher flexibility in installation thereof such as handing on a wall.

Corded telephone set

Next, a description is made for general configuration of the corded telephone set 102. The corded telephone set 102 generally comprises an interface circuit for telephone call with a digital telephone line following a communication protocol of the digital PBX 101, a CODEC circuit for converting a digital signal inputted from the digital line to an analog signal, an analog circuit for outputting/inputting an analog signal with the handset 104, and a CPU for controlling a communication control and each section described above following the communication protocol of the digital PBX 101.

Operations in the embodiments

A description is made for operations in the embodiments of the present invention having the configuration described above. At first, description is made for a method of a bell detection operated in the embodiment, namely a method of comparing a voltage waveform pattern of a detection signal from the vibration sensor circuit 115 to a specified waveform pattern and differentiating a bell sound.

FIG. 5A is an explanatory view for a voltage waveform pattern in a bell sound detection system when a bell sound in the corded telephone set 102 is a first pattern. FIG. 5A-(a) is an explanatory view for the first pattern described above, while FIG. 5A-(b) is an explanatory view for an outputted voltage waveform in the waveform shape-up circuit 305.

Figure 6:
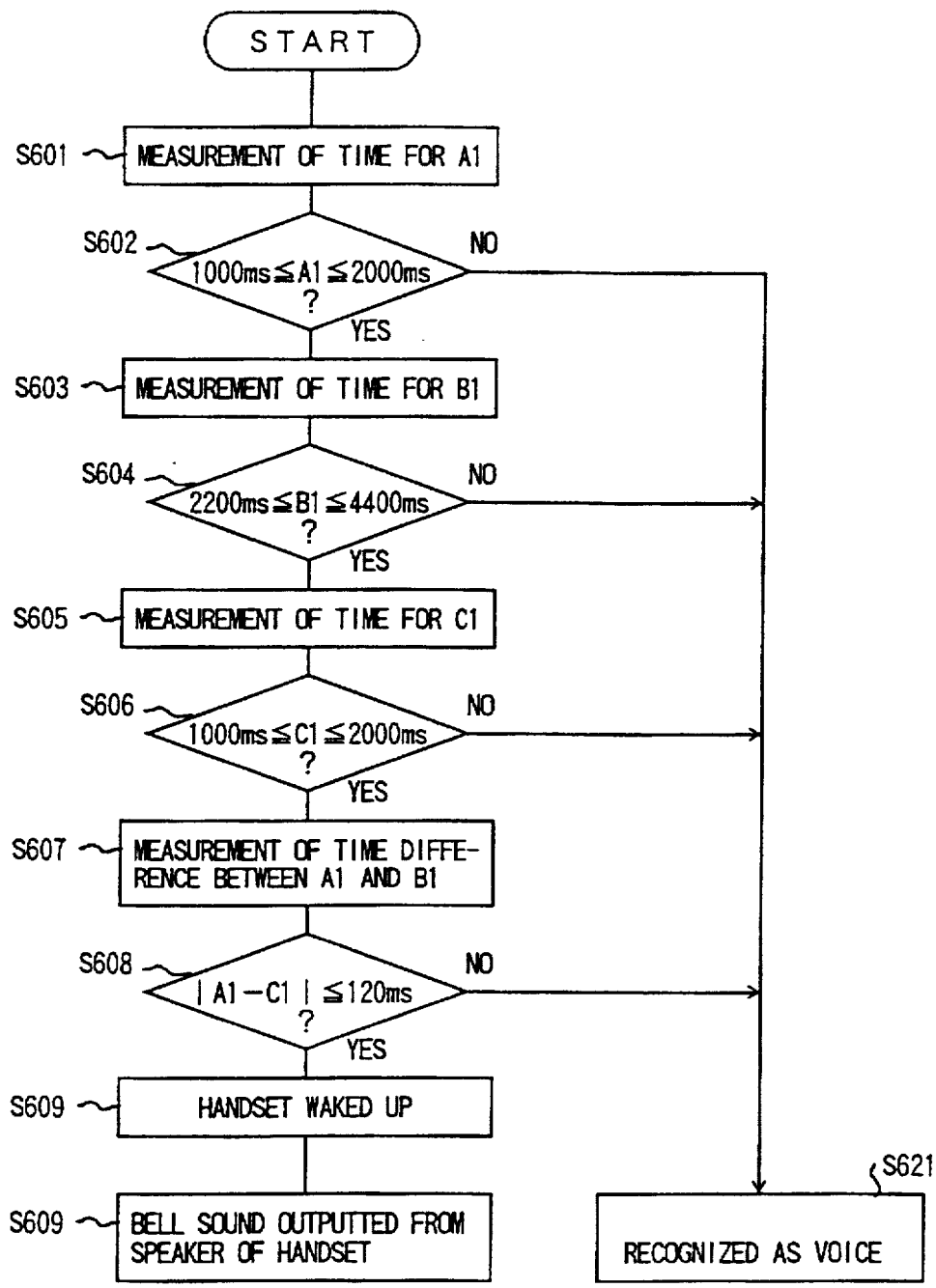
FIG. 6 is a flow chart showing operations for recognizing a bell sound executed by a CPU when a bell sound in a corded telephone set is a first pattern.

Herein, in the CPU 306 in the basic body 103 of the cordless telephone set, a parameter responding to the first pattern is set, and the CPU 306 differentiates a bell sound according to the flow chart shown in FIG. 6.

At first in step S601, a period of time of A1 is measured from the outputted voltage waveform in the waveform shaped-up circuit 305, and in step S602, determination is made as to whether it is within a range from 1000 [ms] or more to 2000 [ms] or less or not.

Then in steps S603 and S604, also for a time period of B1, determination is made as to whether it is within a range from 2200 [ms] or more to 4400 [ms] or less or not, and furthermore in steps S605 and S606, also for a time period of C1, determination is also made as to whether it is within a range from 1000 [ms] or more to 2000 [ms] or less or not.

Furthermore, in steps S607 and S608, in order to determine whether a first cycle and a second cycle are identical or not, determination is made as to whether a time difference is less than 120 [ms] or not.

When a result of determination in steps S602, S604, S606, and S608 satisfies the conditions respectively, it is differentiated as a bell sound by determining that a waveform pattern of a bell detection signal coincides with the first pattern of the bell sound, and in step S609 the handset 105 is waked-up, which is delivered to the CPU in the handset 105 in step S610, then a bell sound is outputted from the speaker in the handset 105.

When a result of determination in steps S602, S604, S606, and S608 does not satisfy conditions respectively, it is differentiated as voice or other sounds (step S621) by determining that a waveform pattern of a bell detection signal does not coincide with the first pattern of the bell sound.

FIG. 5B is an explanatory view for a voltage waveform pattern detected in the bell sound detection system, when a bell sound of the corded telephone set 102 is a second pattern. FIG. 5B-(a) is an explanatory view for the second pattern described above, and FIG. 5B-(b) is an explanatory view for an outputted voltage waveform in the waveform shaped-up circuit 305.

Figure 7:
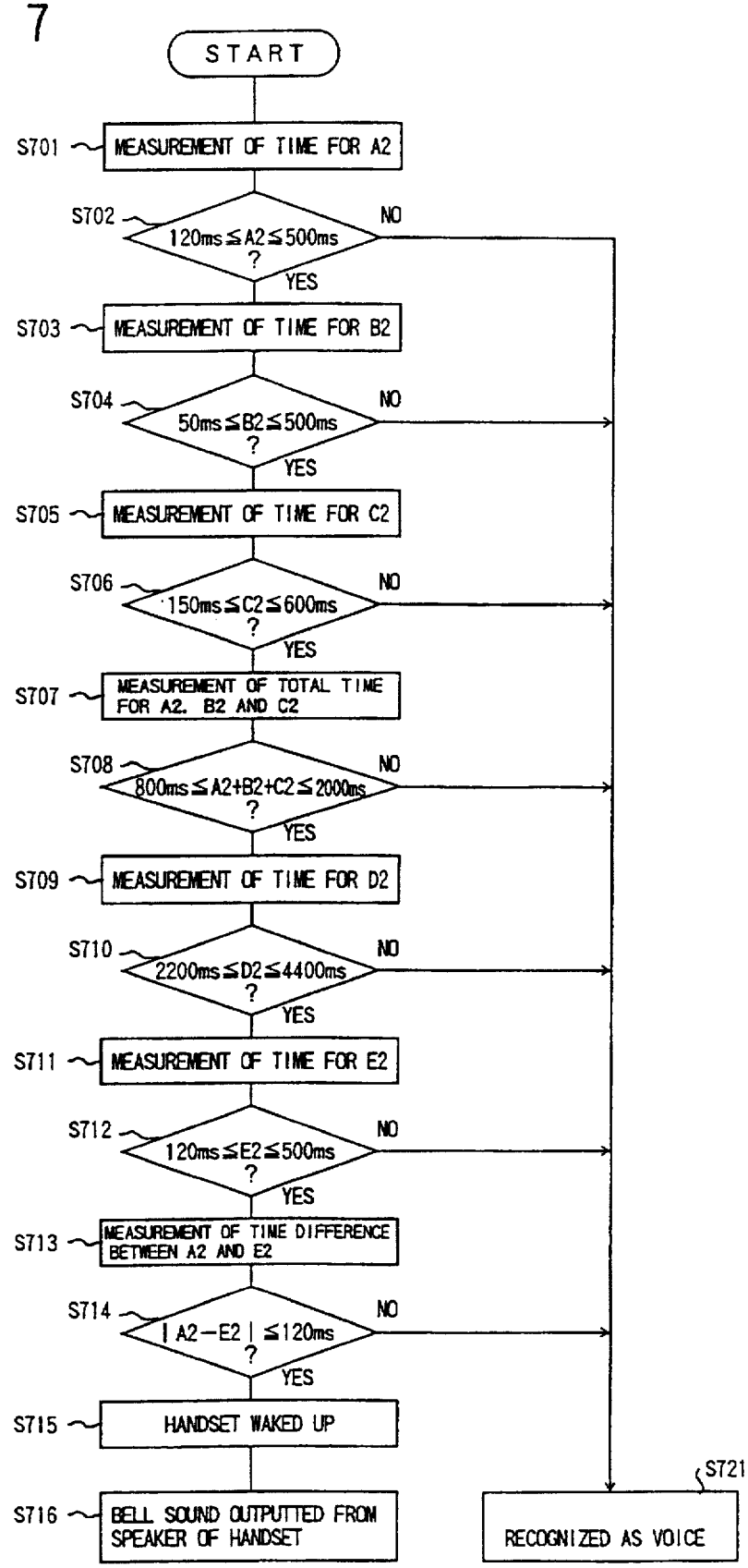
FIG. 7 is a flow chart showing operations for recognizing a bell sound executed by the CPU when a bell sound in the corded telephone set is a second pattern.

Herein, in the CPU 306 in the basic body 103 of the cordless telephone set, a parameter responding to the first pattern is set, and the CPU 306 differentiates a bell sound according to the flow chart shown in FIG. 7. At first in step S701, a period of time of A2 is measured from an outputted voltage waveform in the waveform shaped-up circuit 305, and in step S702, determination is made as to whether it is within a range from 120 [ms] or more to 500 [ms] or less or not.

Then in steps S703 and S704, also for a time period of B2, determination is made as to whether it is within a range from 50 [ms] or more to 500 [ms] or less or not, in steps S705 and S706, also for a time period of C2, determination is made as to whether it is within a range from 150 [ms] or more to 600 [ms] or less or not, furthermore in steps S707 and S708, also for the total period of time of A2, B2, and C2, determination is made as to whether it is within a range from 800 [ms] or more to 2000 [ms] or less or not.

In steps S709 and S710, also for a time period of D2, determination is made as to whether it is within a range from 2200 [ms] or more to 4400 [ms] or less or not, and steps S711 and S712, also for a time period of E2, determination is made as to whether it is within arrange from 120 [ms] or more to 500 [ms] or less or not.

Furthermore, in steps S713 and S714, in order to determine whether a first cycle and a second cycle are identical or not, determination is made as to whether time difference between A2 and E2 is less than 120 [ms] or not. When a result of determination in steps S702, S704, S706, S708, S710, S712, and S714 satisfies the conditions respectively, it is differentiated as a bell sound by determining that a waveform of a bell sound detection signal coincides with the second pattern, and in step S715 the handset 105 is waked-up, which is delivered to the CPU outputted from the speaker in the handset 105.

When a result of determination in steps S702, S704, S706, S708, S710, S712, and S714 does not satisfy the conditions respectively, it is differentiated as voice or other sounds (step S721) by determining that the waveform pattern of the bell sound detection signal coincides with the second pattern.

Although, a bell sound pattern in the first and second telephone sets was described above, a concrete numerical value for determination as to whether an outputted pattern matches a specified one or not is set as a parameter respectively. Namely, in the embodiment of the present invention, in the CPU 306 in the basic body 103 of the cordless telephone set, a parameter responding to a pattern of a bell sound is set, the CPU 306 differentiates a bell sound according to a control sequence referring to a parameter responding to a pattern of the bell sound. It should be noted that the parameter described above should be registered in a table system in a memory or other places, and when a telephone system is provided, the parameter is set responding to the corded telephone set 102, and a bell sound may be differentiated by a control sequence responding to a single control sequence or a setting.

A description is made for operations for telephone call in the embodiment of the present invention. When a user makes a telephone call using the handset 105 of the cordless telephone set, at first a talk switch is turned ON. A control signal from the CPU 305 responding to ON of this talk switch is supplied to the voice switching circuits 406 and 407, and connection of a voice line is switched to the basic body 103 of the cordless telephone set from the handset 104 of the corded telephone set by the voice switching circuits 406 and 407. Also, a control signal for a rotational control of the driving motor 601 is supplied to the driving motor in the relay lifter 106 from the CPU 306 of the cordless telephone set 103. When a rotational control signal is inputted, the driving motor starts rotating. A slider goes up in association with rotation of the driving motor, and when the fact that both of the position detection circuits 421 and 422 are ON is delivered to the CPU 306 therefrom, herein, a hook switch of the corded telephone set 102 is in a OFF state, then telephone call using the cordless telephone set 103 becomes possible.

Then, when telephone call is finished and a talk switch is turned OFF by a user, a control signal for reverse rotational control of the driving motor is supplied from the CPU 306 of the cordless telephone set 103 responding to an OFF state of the talk switch. The slider goes down by reverse rotation of the driving motor, when the fact that both of the position detecting circuits 421 and 422 are OFF is delivered to the CPU 306 therefrom, and the CPU 306 stops reverse rotation of the driving motor.

Then a hook switch of the corded telephone set is turned ON, and communication is terminated. Herein also a control signal from the CPU 306 is supplied to the voice switching circuits 406 and 407, and connection of the voice line is switched to the handset 104 of the corded telephone set 102 from the basic body 103 of the cordless telephone set by the voice switching circuits 406 and 407.

When a reverse rotation control signal is inputted, the driving motor starts rotation in the reverse direction. The slider goes down due to reverse rotation of the driving motor, and when the fact that both of the position detection circuits 421 and 422 are OFF is delivered to the CPU 306 therefrom, the CPU 306 stops rotation of the driving motor. Then a hook switch of the corded telephone set 102 is in a state of ON, communication is terminated.

In the telephone system in the embodiment of the present invention as descried above, even in a case where the corded telephone set 102 responding to a digital line or a digital PBX is connected to the digital line network 111 of the digital PBX 101, the telephone system can allow use of a cheap cordless telephone set 103. Especially, by using the relay lifter 106 described above, the hook switch of the corded telephone set 102 is automatically switched ON/OFF by operation of the talk switch in the handset 105 of the cordless telephone set 103, so that the cordless telephone set described above can be used as same as a normal cordless telephone set without thinking that it is a telephone system connected to the corded telephone set 102.

As described above, with the telephone system according to the present invention, a bell sound of the corded telephone set is detected by a bell sound detector, the bell sound is outputted from the cordless telephone set when the bell sound is received, by operating a talk switch of the cordless telephone set, a hook switch of the corded telephone set is turned ON/OFF using a hook switch ON/OFF unit operated by a first control signal responding to the talk switch, also connection of an aural signal of the wired telephone set is switched to the cordless telephone set using the voice switching unit operated by a second control signal responding to the talk switch, voice is transmitted and received using the cordless telephone set, so that even in a case where the corded telephone set responding to a digital line or a digital PBX is connected to the digital line or the digital PBX, the telephone system can allow use of a cheap cordless telephone set, and also a voice switching unit and a bell sound detection transfer unit are provided in a relay lifter, so that a signal line between the relay lifter and a cordless telephone set may be only one, namely an aural signal, a control signal, and a detection signal can be transacted over only one signal line, so that a telephone system where a freedom of degree in installation of a cordless telephone set can be enhanced, and that enables more flexible system installation can be provided.

With the telephone system according to the present invention, by operating a talk switch of the cordless telephone set, a hook switch of the corded telephone set is turned ON/OFF using a hook switch ON/OFF unit, connection of an aural signal of the corded telephone set is switched to a cordless telephone set using a voice switching unit, voice is transmitted and received using the cordless telephone set, also connection of an aural signal of the corded telephone set is switched to a transmitter/receiver of the corded telephone set using the voice switching unit, and voice is transmitted and received using the transmitter/receiver of the corded telephone set, so that even in a case where the corded telephone set responding to a digital line or a digital PBX is connected to the digital line or the digital PBX, the telephone system can allow use of a cheap cordless telephone set, and at the same time, the corded telephone set can be used as usual.

With the telephone system according to the present invention, voice is transmitted and received by means of radio communication between a transmitter/receiver of a cordless telephone set and the basic body of the cordless telephone set, and voice is transmitted and received by means of corded communication through a voice input/output terminal section of the corded telephone set and a signal input/output terminal section of the corded telephone set, so that even in a case where the corded telephone set responding to a digital line or a digital PBX is connected to the digital line or the digital PBX, the telephone system can allow use of a cheap cordless telephone set.

With the telephone system according to the present invention, a corded telephone set is a telephone set enabling telephone call following a communication protocol of a digital PBX, while a cordless telephone set is a telephone set not enabling telephone call following a communication protocol of the digital PBX, so that even in a case where the corded telephone set responding to a digital line or a digital PBX is connected to a digital line or a digital PBX, the telephone system can allow use of a cheap cordless telephone set, at the same time the corded telephone set can be used as usual.

With the telephone system according to the present invention, a corded telephone set is a telephone set having a CODEC function for converting a digital signal inputted from a digital line to an analog signal, while a cordless telephone set is a telephone set not having a CODEC function for converting a digital signal inputted from a digital line to an analog line, so that even in a case where the corded telephone set responding to a digital line or a digital PBX is connected to a digital line or a digital PBX, the telephone system can allow use of a cheap cordless telephone set, at the same time the corded telephone set can be used as usual.

With the telephone system according to the present invention, a bell sound detector is realized by a vibration sensor for detecting a vibration generated adjacent a speaker of the corded telephone set, a voltage waveform pattern of a detection signal received through a detection signal transfer unit in the relay lifter is compared to a specified waveform pattern to differentiate a bell sound, and when a bell sound is identified, a bell sound is outputted from a speaker of the cordless telephone set, so that a telephone system where a bell sound specific to the corded telephone set can be detected without fail and malfunction due to a bell sound generated an adjacent telephone set or other sounds does not occur can be provided.

With the telephone system according to the present invention, a relay lifter is monolithically mounted to the corded telephone set with a mount bracket and a metal fitting, so that a telephone system where a freedom of degree of the cordless telephone set can be enhanced, and that enables more flexible system installation by making only one from a signal line between the cordless telephone set and the corded telephone set (relay lifter) can be provided.

Furthermore, with the bell sound detecting method according to the present invention, in the first step, a voltage waveform pattern of a detection signal is obtained from a vibration sensor for detecting vibration near a speaker of a telephone set, in the second step, the voltage waveform pattern of the detection signal is compared to a specified waveform pattern, and furthermore in the third step, if, as a result of comparison in the second step, it is determined that a voltage waveform of the detection signal is the same as the specified waveform, the waveform is recognized as for a bell sound, so that a bell sound detecting method enabling differentiation of a bell sound of or vibration caused of voice sound from adjacent telephone set can be provided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A telephone system comprising:
 a corded telephone set having the CODEC function for converting a digital signal inputted from a digital line to an analog signal;
 a cordless telephone set having a talk switch;
 a relay lifter; and
 a bell sound detector for detecting a non-electrical vibration of a bell sound in said corded telephone set, wherein said relay lifter comprises:
 a hook switch ON/OFF unit for providing ON/OFF control over a hook switch of said corded telephone set according to a first control signal responding to said talk switch of said cordless telephone set;

a voice switching unit for switching connection of an aural signal between a corded telephone set and said cordless telephone set according to a second control signal responding to said talk switch of said cordless telephone set, wherein the operating of said talk switch of said cordless telephone set turns ON or OFF said hook switch of said corded telephone set, and said voice switching unit switches connection of an aural signal from said corded telephone set to said cordless telephone set; and a detection signal transfer unit coupled to said bell sound detector for transferring a detection signal from said bell sound detector to said cordless telephone set when an incoming call is received, wherein said cordless telephone set compares a voltage waveform pattern of a detection signal over time to a predetermined waveform pattern and outputs a bell sound from said cordless telephone set when said comparison differentiates a bell sound pattern.

2. A telephone system according to claim 1, wherein said relay lifter is monolithically mounted to said corded telephone set with a mount bracket and a metal fitting, and said relay lifter is capable of lifting the handset of the corded telephone set.

3. A telephone system according to claim 1, wherein said corded telephone set is a telephone set which enables telephone calls following a communication protocol for a digital PBX, and said cordless telephone set is a telephone set not enabling telephone calls following the communication protocol for a digital PBX.

4. A telephone system according to claim 1, wherein, when voice is transmitted or received by using said cordless telephone set, voice is transmitted and received by means of radio communication between a handset of said cordless telephone set and a basic body of said cordless telephone set, or by means of wired communication via a voice input/output terminal section of said corded telephone as well as a signal input/output terminal section of said corded telephone set between said cordless telephone set and said corded telephone set.

5. A telephone system according to claim 1, wherein the operating of said talk switch of said cordless telephone switch to turn ON or OFF a hook switch of said corded telephone set using said hook switch ON/OFF unit, switching can be made between a first calling mode and a second calling mode by said voice switching unit, wherein voice is transmitted and received using said cordless telephone set in said first calling mode, and voice is transmitted and received using said corded phone in said second calling mode.

6. A telephone system according to claim 5, wherein said corded telephone set is a telephone set which enables telephone calls following a communication protocol for a digital PBX, and said cordless telephone set is a telephone set not enabling telephone calls following the communication protocol for a digital PBX.

7. A telephone system according to claim 5, wherein, when voice is transmitted or received by using said cordless telephone set, voice is transmitted and received by means of radio communication between a handset of said cordless telephone set and a basic body of said cordless telephone set, or by means of wired communication via a voice input/output terminal section of said corded telephone as well as a signal input/output terminal section of said corded telephone set between said cordless telephone set and said corded telephone set.

8. A telephone system according to claim 7, wherein said corded telephone set is a telephone set which enables telephone calls following a communication protocol for a digital PBX, and said cordless telephone set is a telephone set not enabling telephone calls following the communication protocol for a digital PBX.

9. A telephone system according to claim 1, wherein said bell sound detector is a vibration sensor for detecting vibration near a speaker of said corded telephone, and said cordless telephone set has a controller for comparing a voltage waveform pattern of a detection signal received via a detection signal transfer unit in said relay lifter to a specified waveform pattern to recognize a bell sound and causing a speaker of the cordless telephone set to output a bell sound when said controller recognizes a bell sound.

10. A telephone system according to claim 9, wherein said relay lifter is monolithically mounted to said corded telephone set with a mount bracket and a metal fitting, and said relay lifter is capable of lifting the handset of the corded telephone set.

11. A bell sound detecting method comprising the steps of: a first step for obtaining a voltage waveform pattern of a detection signal from a vibration sensor detecting vibration near a speaker of a corded telephone set, a second step for comparing a voltage waveform pattern of said detection signal over time to a specified waveform pattern, and a third step for determining a voltage waveform pattern as a bell sound if said voltage waveform of said detection signal is the same as said specified waveform pattern, and a fourth step of causing a bell sound to be output at a handset of a cordless telephone set.

* * * * *